United States Patent [19]
Helmy

[11] Patent Number: 6,105,307
[45] Date of Patent: Aug. 22, 2000

[54] SWIVEL EDGE PLANTER

[76] Inventor: Ibrahim F. Helmy, 13338 Huntsman Rd., San Antonio, Tex. 78758

[21] Appl. No.: 08/940,362

[22] Filed: Sep. 30, 1997

Related U.S. Application Data

[60] Provisional application No. 60/027,199, Sep. 30, 1996.
[51] Int. Cl.[7] ............................... A01G 1/00; A01G 9/02
[52] U.S. Cl. .............................. 47/33; 47/65.5; 47/66.1; 47/66.5; 47/66.3
[58] Field of Search ................................ 47/33, 39, 65.5, 47/66.1, 66.3, 66.4, 66.5; 52/102, 311.1, 311.2

[56] References Cited

U.S. PATENT DOCUMENTS

| | | | |
|---|---|---|---|
| 2,888,779 | 6/1959 | Hostetter | 47/33 |
| 3,373,668 | 3/1968 | Moore et al. | 404/41 |
| 3,537,687 | 11/1970 | Adelman | 256/19 |
| 4,813,178 | 3/1989 | Ferrand | 47/77 |
| 4,884,920 | 12/1989 | Perazzi | 405/384 |
| 5,080,523 | 1/1992 | Steiner | 404/7 |
| 5,119,587 | 6/1992 | Waltz | 47/33 |
| 5,157,867 | 10/1992 | Fritch | 47/33 |
| 5,259,154 | 11/1993 | Lilley | 47/33 |

FOREIGN PATENT DOCUMENTS

| | | | |
|---|---|---|---|
| 10824 | 5/1980 | European Pat. Off. | 47/66.5 |
| 2945292 | 5/1981 | Germany | 47/33 |
| 4137814 | 5/1993 | Germany | 47/33 |
| 110004 | 6/1964 | Netherlands | 47/33 |

*Primary Examiner*—Michael J. Carone
*Assistant Examiner*—Fredrick T. French, III
*Attorney, Agent, or Firm*—David G. Henry

[57] ABSTRACT

The invention is of a modular landscape border system with constituent accessory units which interlock in a swivel interface to define a border of length limited only by the number of units used. The units are of unibody construction and are made of durable, high density polyethylene. A completed border assemblage according to the preferred embodiment provides an alternating array of circular and elongate receptacles which can be filled with any choice of plants or decorative materials (rocks, shells, bark, etc.).

1 Claim, 1 Drawing Sheet

SWIVEL EDGE PLANTER

This is a continuation-in-part conversion of Provisional application (35 USC 119[e]) of copending application Ser. No. 60/027,199 filed on Sep. 30, 1996.

CITATION TO PROVISIONAL PARENT APPLICATION

This application is filed pursuant to 35 U.S.C. §119(e) in relation to Provisional Patent Application Serial No. 60/027, 199 filed Sep. 30, 1996 from which application priority is claimed.

BACKGROUND OF THE INVENTION

1. Field of The Invention

Applicant's invention relates to landscaping accessories.

2. Background Information

Grooming, changing, and/or accessorizing landscaping is an activity which goes on in all but the most concrete-encased, urban home and business environments. A common characteristic of virtually any well-maintained landscape includes some special treatment of borders and edges; edges of walkways, borders between flower beds and surrounding turf, edges of pathways, etc.

Presently known edge and border treatments include simply manicuring turf at the juxtaposition of turf and concrete, installing plastic or metal strips which rise from the ground and delimit plant beds from surrounding areas, the installation of flower beds along walkways, the use of stone or brick borders, and many other treatments. Shortcomings are associated with all of these edge treatments; they require constant maintenance, are ineffective as growth barriers between dissimilar plant growth areas, are expensive to have maintained or installed, and/or tend to be somewhat permanent.

It would be desirable to provide both professional and amateur landscapers with a new landscape accessory for use in delimiting the various zones or areas which might exist in landscapes (walkways, paths, plant beds, ponds, etc.).

SUMMARY OF THE INVENTION

It is an object of the present invention to provide a novel landscape accessory.

It is another object of the present invention to provide a novel modular landscape accessory for use in delimiting dissimilar areas in a landscape decorating scheme.

It is another object of the present invention to provide a novel modular, cost-effective landscape border system for establishing or decorating existing borders in a landscape decorating scheme.

It is another object of the present invention to provide landscape accessory which is both decorative and effective as a plant growth barrier.

It is yet another object of the present invention to provide a modular landscape border defining accessory which, without custom fabrication of component elements, can define a near infinite number of border contours and dimensions.

In satisfaction of these and related objectives, Applicant's present invention provides a landscape accessory which, as part of a modular landscape system, is useful in decorating existing borders in a landscape, or establishing borders anew. The accessory of the present invention is a plastic unit which swivelly interlocks with like additional accessory units at either end of the unit to collectively define an elongate, ground covering border assemblage of virtually any length or contour.

The preferred embodiment of each accessory unit defines two receptacles, either or both of which can serve as a planter ("flower pot") or as a receptacle for decorative rock or bark. Each unit simply rests atop the ground surface, but forms an effective growth barrier for containing grass or other creeping vegetation. Installation involves no more than progressively interlocking so many of the units as are required to form the desired length and configuration of landscape border, and placing the units in their desired positions atop the ground surface. Removing or changing the border is, unlike presently known border system, very simple and need not involve any cost whatsoever; the units are merely moved to extend along the newly preferred border path.

DETAILED DESCRIPTION OF THE PREFERRED EMBODIMENT

Figure 1:
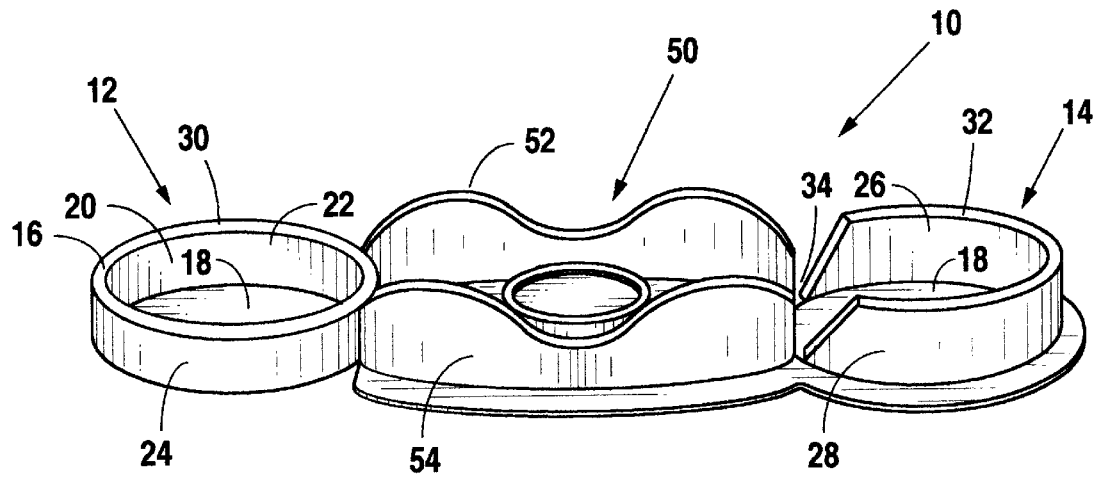
FIG. 1 is a perspective view of the landscape accessory unit of the preferred embodiment.
Figure 2:
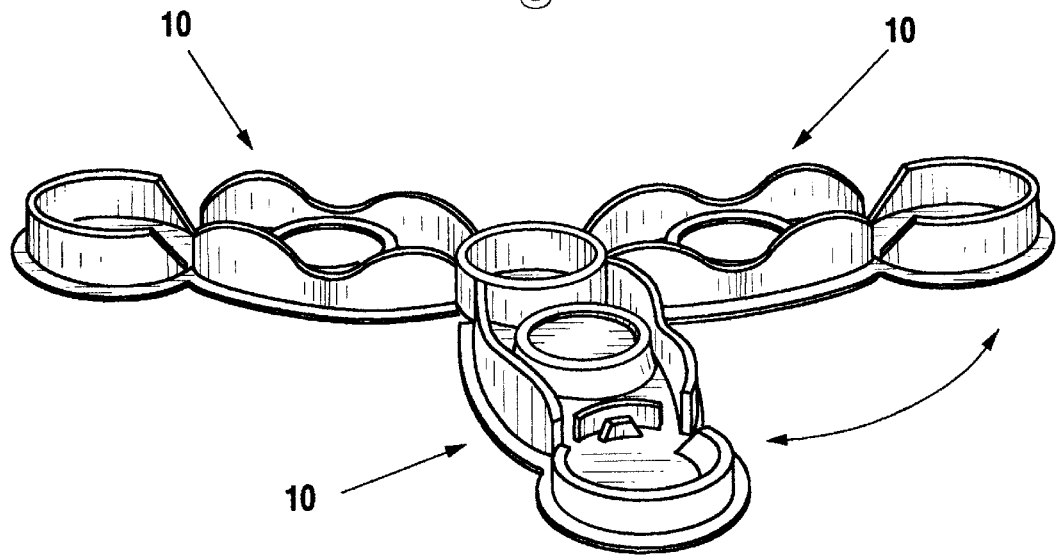
FIG. 2 depicts an assemblage of two landscape units and the range-of-motion permitted by the interface between the units.
Figure 3:
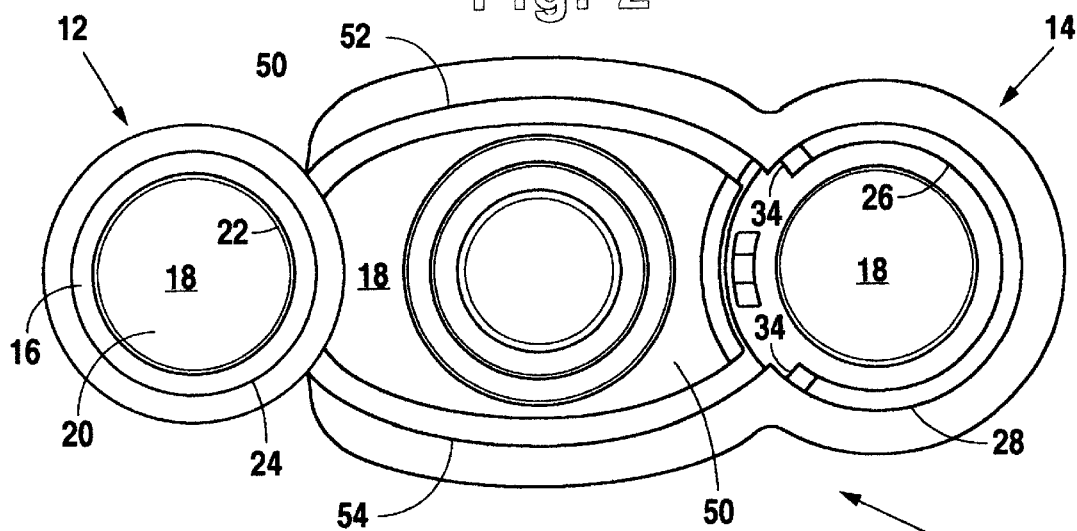
FIG. 3 is a top plan, mechanical drawing view of the landscape unit of the present invention.

Referring in combination to FIGS. 1 and 2, each landscape unit of the landscape border system of the present invention is identified generally by the reference numeral 10.

Landscape units 10 are, in the preferred embodiment, of unibody construction, and are most cost-effectively manufactured of high density polyethylene and through vacuum forming. On a first end of each landscape unit 10 is formed a hinge ring 12. On the opposite, second end of each unit 10 is formed a hinge ridge 14. Between the hinge ring 12 and hinge ridge 14 of unit 10 (and any preferred embodiment of the present invention) is a central trough 50. Trough 50 is delimited by side walls 52 and 54 which rise from a trough floor (not visible in the drawings) on either long side of unit 10.

Hinge ring 12 is a hollow, circular ridge 16 which, on the top face 18 of unit 10, delimits a planter receptacle 20 with the inner face 22 of ridge 16 forming an annular wall for planter receptacle 20. In part, because units 10 are vacuum formed from a single layer of plastic sheeting, a circular hollow exists between the plastic forming the inner face 22 and outer face 24 of ridge 16 which hollow opens to the bottom face of unit 10 (not visible in the figures). Even if units 10 were not so formed, for reasons soon apparent, the just-described hollow will be present in any preferred embodiment of the present invention.

Hinge ridge 14 is a semi-circular structure having an inner face 26 and an outer face 28 which are separated by a hollow space of substantially equal annular thickness as hinge ring 12. Hinge ring 12 and hinge ridge 14 of substantially equal thickness and height (measured from their respective floors 30 and 32) and are defined by circles of substantially equal diameter. Swivel gaps 34 are defined between the two termini of hinge ridge 14 and the respective adjacent side walls 52 and 54.

Because of the complimentary dimensions and contours of hinge ring 12 and hinge ridge 14, as well as the swivel gaps 34, a hinge ridge 14 of a first unit 10 may nest within the hollow of hinge ring 12 of a second unit 10 to form two links of a chain (as depicted in FIG. 2). The circular shape of the hinge ring 12 and hinge ridge 14 permits a pivoting motion between adjacent units 10, as is depicted in the range-of-motion features of FIG. 2.

Resulting from a chain of interlocked preferred embodiment units 10 is a succession of alternating plant receptacles 20 and troughs 50. The assemblage can be configured to follow a path of any shape, a feature made possible by the swivel interlock between any two adjacent units 10. Of course, unlike the circular shape of hinge rings 12 and hinge ridges 14, the shape of central trough 50 is not a crucial design element, and can itself be circular, or any other desired shape (a star, for example). Only the hinge rings 12 and hinge ridges 14 must be circular to permit the pivotal motion between adjacent, nested units 10.

While taste dictates that which users will place within the receptacles 20 and troughs 50, a very attractive use of an assemblage of units 10 involves placing bedding plants in each of the receptacles 20 and placing decorative rocks or gravel in each of the troughs 50.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A modular landscape border system comprising:

a plurality of border units, each said unit being constructed of a single, thin, molded plastic sheet with an inner sheet face, an outer sheet face and having contours, said contours of said plastic sheet on said outer sheet face defining a circular hinge ring at a first end of said border unit and a semicircular hinge ridge at a second end of each said border unit;

each said hinge ring defining, on said outer sheet face, a planter receptacle encircled by an inner face forming an annular wall, and on said inner sheet face a circular hinge ring -hollow formed by a circular protrusion respectively corresponding to said inner face forming said annular wall of said planter receptacle and said outer sheet face of the border unit thereof, each said hinge ridge on said outer sheet face being sized and shaped for nesting interface with said hinge ring hollow of an adjacent border unit whereby said semicircular hinge ridge of said outer sheet face of a first border unit may be nestingly interfaced into said hinge ring hollow of said inner sheet face of a second, adjacent border unit, whereby each said border unit may pivot relative to each said border unit with which said border unit is nestingly interfaced;

said hinge ring and said hinge ridge of each said border unit being separated by an expanse of said plastic sheet which is contoured to form an intervening trough bounded by a trough wall contour;

each said border unit further exhibiting an outer margin which lies substantially in a singe plane relative to said contours of said plastic sheet for continuously contacting a ground surface on which each said border unit is placed when said inner sheet face is directed toward said ground surface whereby said border unit serves as a substantially uninterrupted demarcation on said ground for controlling propagation of plants.

* * * * *